March 25, 1930. H. H. GLASIER 1,751,694
SOIL TILLING DEVICE
Filed Oct. 3, 1927 3 Sheets-Sheet 1
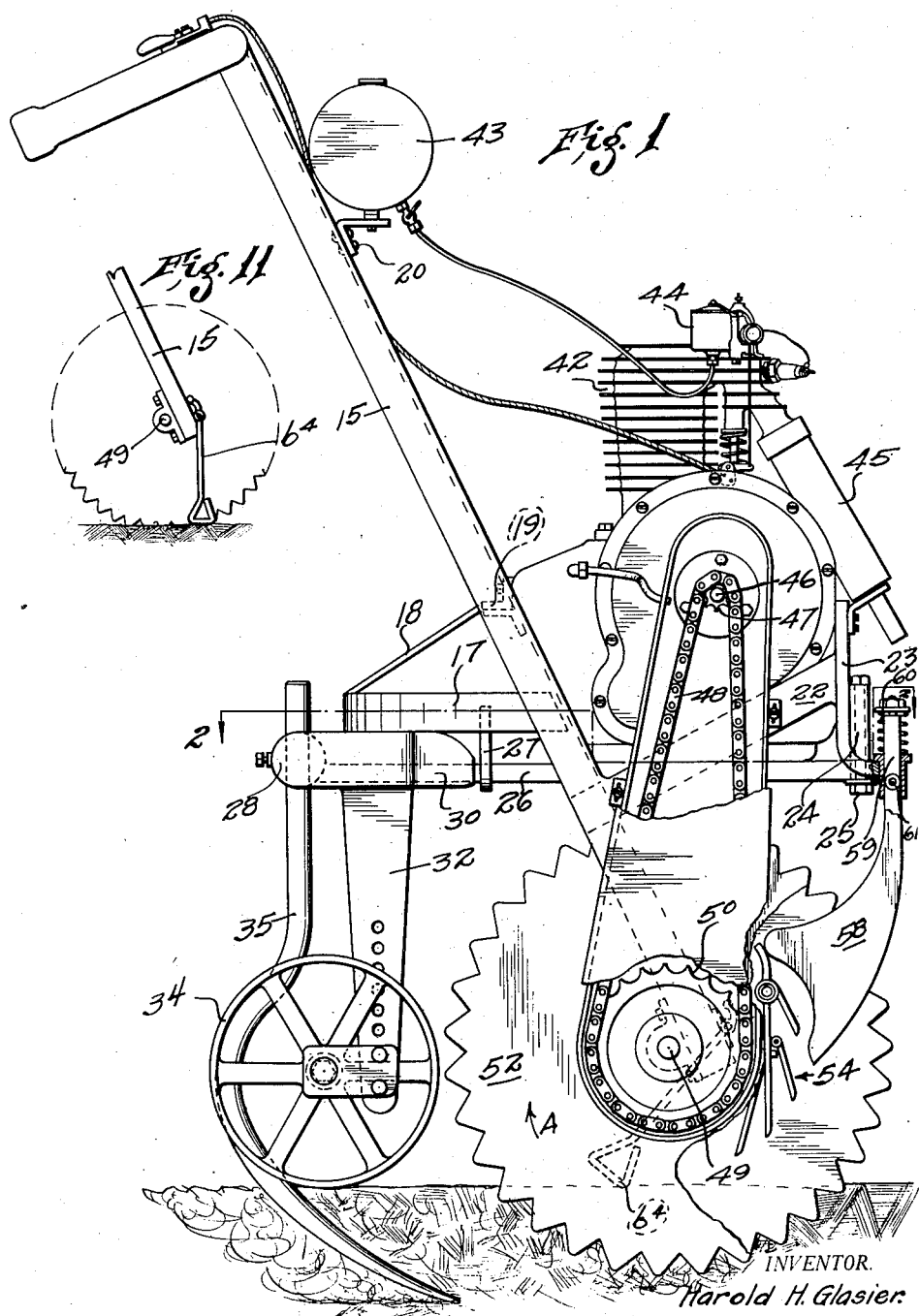
INVENTOR.
Harold H. Glasier
BY Westall and Wallace
ATTORNEYS

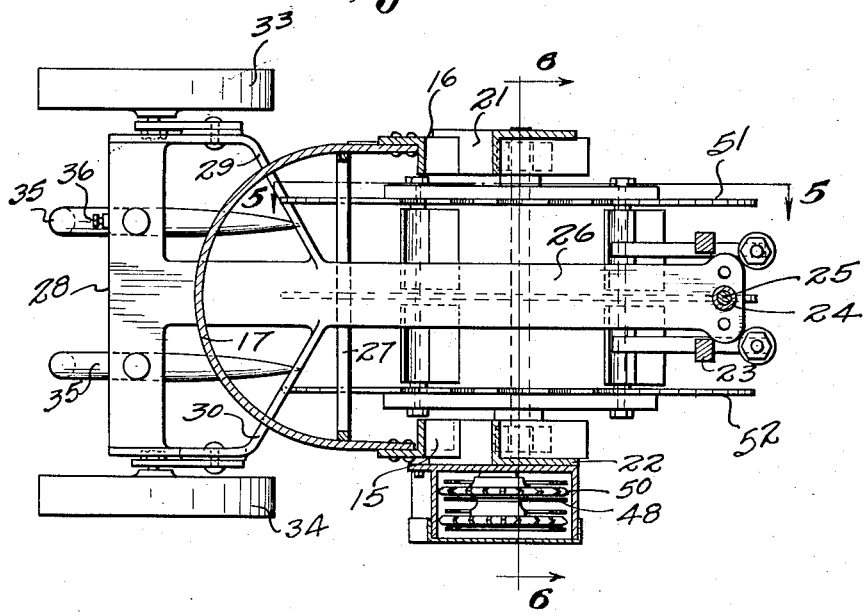
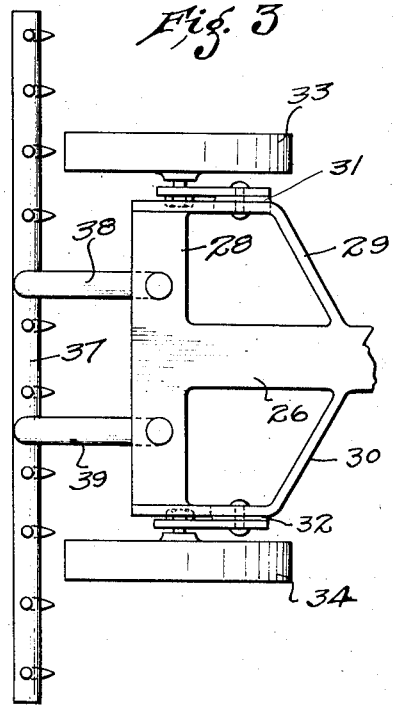
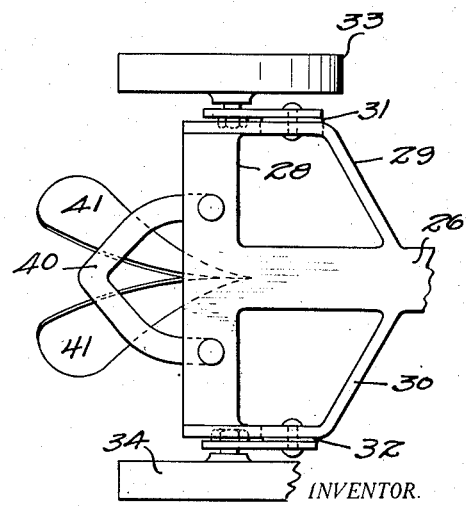

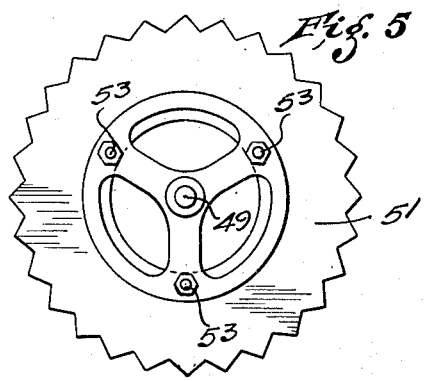
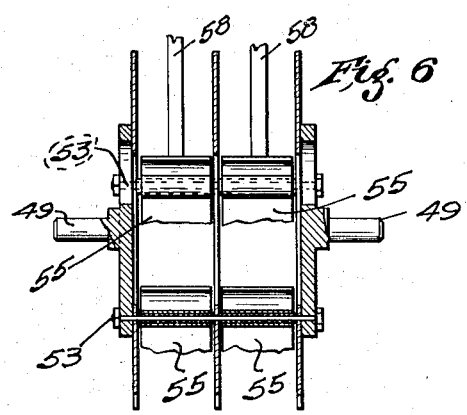
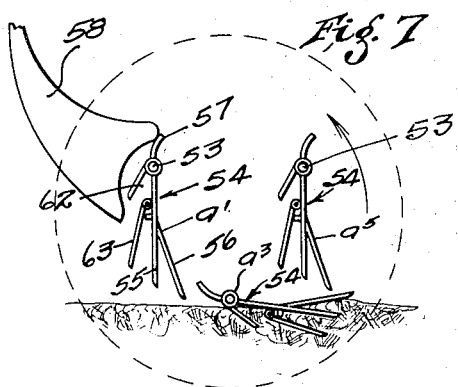
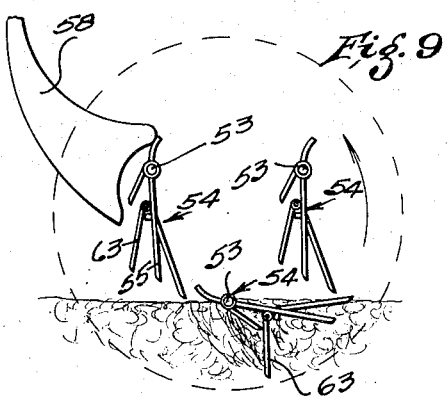
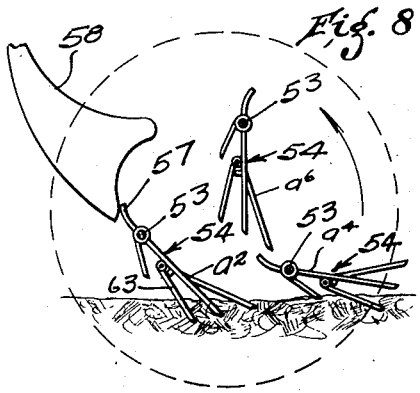
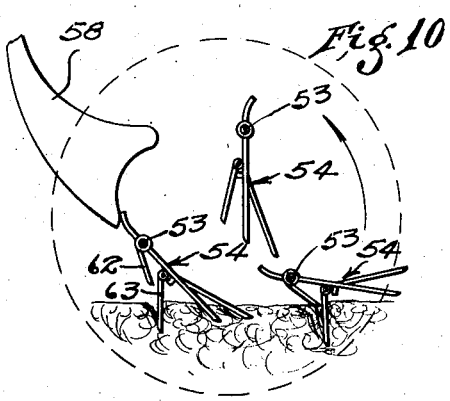

Patented Mar. 25, 1930

1,751,694

UNITED STATES PATENT OFFICE

HAROLD H. GLASIER, OF LOS ANGELES, CALIFORNIA

SOIL-TILLING DEVICE

Application filed October 3, 1927. Serial No. 223,642.

This invention relates to a power driven implement for breaking up soil for any purpose, but is more especially useful for agricultural purposes. It appertains more especially to an instrument suitable for gardens and small farm work.

The primary object of this invention is to provide an implement the operator of which walks, which is compact, light in weight, mechanically simple, efficient and easily manipulated. It is an object of this invention to provide propelling means comprising rotary disks or wheels which perform the combined function of traction members and cutting disks. Another object of this invention is to provide novel cultivator shoes for the implement. These objects together with other objects, corresponding accomplishments and advantages are obtained by means of the embodiment of my invention illustrated in the accompanying drawing, in which:

Fig. 1 is a side elevation of a complete implement having a ground working tool hitched thereto, portions being broken away to better show the invention; Fig. 2 is a section as seen on the line 2—2 of Fig. 1; Fig. 3 shows in plan a harrow, fragments of the rear end of the implement only being shown; Fig. 4 shows in plan a furrow opener; Fig. 5 is a vertical section between the propeller disks as seen on the line 5—5 of Fig. 2; Fig. 6 is a vertical section through the cutter wheels showing the shoes and guides, parts being broken away to better show the relation of the guides and shoes; Figs. 7 to 10 inclusive show a shoe in various positions, the disk being indicated in dotted lines; and Fig. 11 shows diagrammatically a cutter wheel and lifting stand.

Referring more particularly to Fig. 1 and 2, a pair of spaced handle bars 15 and 16 are connected by an arched member 17 having a brace 18 secured to a cross member 19. A cross bar 20 is a further aid in holding the handle bars in spaced position. Similar brackets numbers 21 and 22 have a cross plate 23, further serving to rigidly hold the handle bars in spaced relation. At the forward face of the cross plate 23 is a socket 24 for a pin 25, serving as a pivot pin for a drawbar 26. A bar 27 embraces the drawbar on its lower side permitting the bar to swing about its pivot pin 25.

At the end of the draw bar 26 is a cross or attachment bar 28 upon which various ground working tools may be mounted. Extending forwardly from the end of the attachment bar 28 and joined to the drawbar are side braces 29 and 30. Extending downwardly from the braces 29 and 30 are standards 31 and 32, and journalled thereon are carrier wheels 33 and 34. The structure just described comprises broadly a main frame which may be guided by the operator and to which a hitch frame is coupled by means of drawbar 26. In the attachment member 28 are holes in which are disposed shanks of ground working tools. Thus, in Figs. 1 and 2, these are shown as cultivator teeth 35 which may be held in position upon the cross bar 28 by means of screws 36. In Fig. 3, a harrow is shown comprising a bar 37 which is fixed thereon and coupling bars 38 and 39 extending upwardly therefrom for disposition in the holes of attachment member 28. In Fig. 4, a coupling yoke 40 is shown fastened to the hitch frame having at its lower end furrow opener shares 41. It is obvious that any desired type of soil working tool may be coupled to the hitch frame.

Supported upon the frame is an engine herein disclosed as an air cooled gasoline engine. The power plant comprises the engine 42, which receives its fuel from a tank 43 by way of a carbureter 44. A muffler is indicated by 45. A drive shaft 46 is operated by the engine and has sprocket pinions 47 over which passes a double sprocket chain 48. Journalled in bearings at the lower ends of the handle bar are stub shafts 49 one having fixed thereto sprocket gears 50 over which the chain 48 passes. Mounted upon the shaft 49 are the traction cutter wheels later described. The details of the power plant are not pertinent to the present invention. However, it will be noted that the power plant just described includes no clutch, a clutch not being necessary with the present structure and simplifying the complete machine.

Operation of the engine will cause rotation of the shaft 49. Mounted upon the shaft are the traction cutter wheels 51 and 52. These wheels are of similar construction and are for the purpose of cutting or incising the ground. They are preferably toothed on their peripheries. Assuming that the machine is anchored at the rear, such as is shown in Figs. 1 and 2 by means of ground working tools embedded in the soil, rotation of the cutter wheels in the direction of the arrow A as shown in Fig. 1 will tend to move the implement forward. The traction cutter wheels tend to dig into the ground and turn the entire implement about a pivot located at the anchorage of the tools in the ground. This insures the traction cutters imbedding themselves in the ground and penetrating the latter a distance sufficient to produce a cut of considerable depth. If the tools are not anchored to the ground, the tendency will be for the cutter wheels to ride over the ground surface without making incisions. Obviously any ground working tool taking hold of the ground will perform the anchorage function. The hitch frame follows the main frame, swinging about its pivot pin and being prevented from upending by reason of the yoke at the end of the hitch riding against the arch 17. When it is desired that the tool and cutter wheels be withdrawn from the ground, it is sufficient to push forwardly on the handle bar so as to elevate and withdraw the ground working tool, which causes the cutter wheels to climb out of the ground. The tool may then be easily manipulated, such as in turning and work again started upon the ground by forcing the ground working tool into the soil. This may be done by allowing the ground working tool to contact with the ground so as to take hold and provide an anchorage. The cutter wheels then cut into the ground. It will be noted that the tractor cutter wheels perform the function of creating a traction for the tool as well as incising the ground. There are instances in which it is desirable to obtain a firmer grip upon the ground than is afforded by the disks or to cultivate the ground by stirring up and overturning the soil as is done by a shovel or hoe. To this end, shafts 53 are extended between the traction wheels and also hold the disks together. These shafts, herein shown as three in number, carry shoes, indicated generally by 54. The shoes are the same in construction, and it will be sufficient to describe one and its operation. In Figs. 5 to 10, each shoe is shown in various positions during its travel with the wheels. A shoe consists of a foot 55 having extending from one side a toe 56. Opposite to the toe is a heel 57 adapted to engage a guide 58 resiliently suspended from the main frame by means of a shank 59 and retention spring 60. There is a hinge 61 so that if the guide is forced down by an irregular action, it may swing to clear the shoe. Extending from the other side of the foot 55 and at an angle thereto is a talon 62. Adjacent to the front end of the foot 55 and on the forward side is a pivoted toe 63. The action of the shoes upon hard soil is shown in Figs. 7 and 8. A shoe as it approaches the ground has the toe 56 first engaged with the ground surface at a slant. The shoe in its first position about to engage the ground is marked $a^1$ in Fig. 7. Continuous rotation of the traction wheel forces the shoe into the ground wheel as indicated by $a^2$ in Fig. 8. The shoe is then turned on its axis 53, the heel 57 being directed by guide 58 so as to force it into the ground instead of allowing it to slide along. The heel next slides off the guide and the shoe is thrust back as indicated by $a^3$ in Fig. 7. Next the elevation of the shoe is begun as indicated by $a^4$ in Fig. 8. The shoe swings as it is elevated into the positions $a^5$ and $a^6$ of Figs. 7 and 8 respectively. The action of the shoe in soft soil is substantially the same except the pivoted toe 63 passes directly down into the soil. If the soil is sufficiently loose the toe 63 opens up as it passes down into the soil and takes a deeper and firmer hold. Various other forms of the shoe may be employed to add traction and stir the soil. To stop the travel of the device, the handles are pulled back to lift the tractor wheels. Stands $b^4$ are pivotally mounted on the handles as shown best in Figs. 1 and 11 and will swing under from the position shown in Fig. 1 to that in Fig. 11 and hold the tractor wheels out of working position.

What I claim is:

1. A soil tilling implement comprising a frame, a traction and ground breaking wheel journalled at the forward end thereof adapted to cut into and penetrate the ground to effect tillage, motor means for rotating said wheel and a ground working tool at the rear of said wheel arranged to engage the soil and create a drag upon said implement.

2. A soil tilling implement comprising a main frame, a traction and ground breaking wheel having a serrated periphery arranged to penetrate into and break the ground to effect tillage, a hitch frame pivotally secured to said main frame so as to follow, motor means for rotating said wheel, and a ground working tool depending from said hitch frame arranged to engage the soil and create a drag upon said implement.

3. A soil tilling implement comprising a main frame having guide handles, a traction and ground breaking wheel journalled at the forward end thereof adapted to incise and break the ground to effect tillage, motor means for rotating said wheel, a hitch frame pivotally secured to said main frame so as to follow, said hitch frame having carrier wheels, and a working tool at the rear of said hitch frame and depending therefrom arranged to engage the soil and create a drag on said implement.

4. A soil tilling implement comprising a support, a plurality of traction wheels mounted thereon, traction shoes pivotally mounted intermediate said wheels for engaging the ground, motor means for rotating said wheels, and a ground working tool at the rear of said support arranged to engage the soil and create a drag on said implement.

5. A soil tilling implement comprising a main frame, a plurality of traction wheels journalled thereon at the front, pivotally mounted traction shoes intermediate said wheels for engaging the soil, motor means for rotating said wheels, a hitch frame pivotally secured to said main frame so as to follow, and a ground working tool at the rear of said wheels arranged to engage the soil and create a drag upon said frame.

6. A soil tilling implement comprising a main frame having a guide, a plurality of traction wheels journalled at the forward end thereof adapted to cut into and penetrate the ground, motor means for rotating said wheels, a hitch frame pivotally secured to said main frame so as to follow and provided with carrier wheels, a ground working tool at the rear of said hitch frame arranged to engage the soil and create a drag thereon, and pivotally mounted tractor shoes intermediate said wheels for engaging the soil.

7. A soil tilling implement comprising a main frame including parallel handle bars extending downwardly, a traction and ground breaking wheel journalled at the forward lower end between said bars adapted to incise the ground to a considerable depth to effect tillage, motor means for rotating said wheel, a hitch frame including a drawbar pivotally secured to the forward end of said main frame so as to follow, carrier wheels for said hitch frame, and a ground working tool secured to said hitch frame and depending therefrom so as to engage in the soil and create a drag on said implement.

8. A soil tilling implement comprising a main frame including parallel handle bars extending downwardly, a pair of traction wheels journalled at the forward lower end between said bars adapted to incise the ground, shoes pivotally mounted intermediate said wheels for engaging the ground, motor means for driving said wheels, a hitch frame including a drawbar pivotally secured to the forward end of said main frame so as to follow, carrier wheels for said hitch frame, and a ground working tool secured to said hitch frame and depending therefrom so as to engage in the soil and create a drag upon said implement.

9. A soil tilling implement comprising a support, a traction wheel journalled thereon, traction shoes pivotally mounted thereon at the side thereof for engaging the ground, motor means for rotating said wheel and a ground working tool at the rear of said wheel arranged to engage the soil and create a drag on said implement.

10. A soil tilling implement comprising a main frame, a traction wheel journalled thereon at the front, traction shoes pivotally mounted thereon at the side thereof for engaging the ground, motor means for rotating said wheel, a hitch frame pivotally secured to said main frame so as to follow and a ground working tool at the rear of said wheel arranged to engage the ground and create a drag thereon.

11. A soil tilling implement comprising a frame, a traction and ground breaking wheel journalled thereon and adapted to cut into and break the ground to a considerable depth to effect tillage, motor means for rotating said wheel, and a ground working tool arranged to dig into the ground and furnish a fulcrum for said wheel to tend to revolve about and thereby penetrate the ground.

12. A soil tilling implement comprising a frame, a tractor and ground breaking element mounted thereon and adapted to penetrate, grip and break the ground to effect tillage, motor means for actuating said element, and a ground working tool disposed to dig into the ground and furnish a fulcrum for said element to tend to revolve about and thereby to penetrate the ground.

In witness that I claim the foregoing I have hereunto subscribed my name this 19th day of September, 1927.

HAROLD H. GLASIER.